No. 892,135. PATENTED JUNE 30, 1908.
C. A. CONROE.
RESILIENT VEHICLE WHEEL.
APPLICATION FILED AUG. 10, 1906.
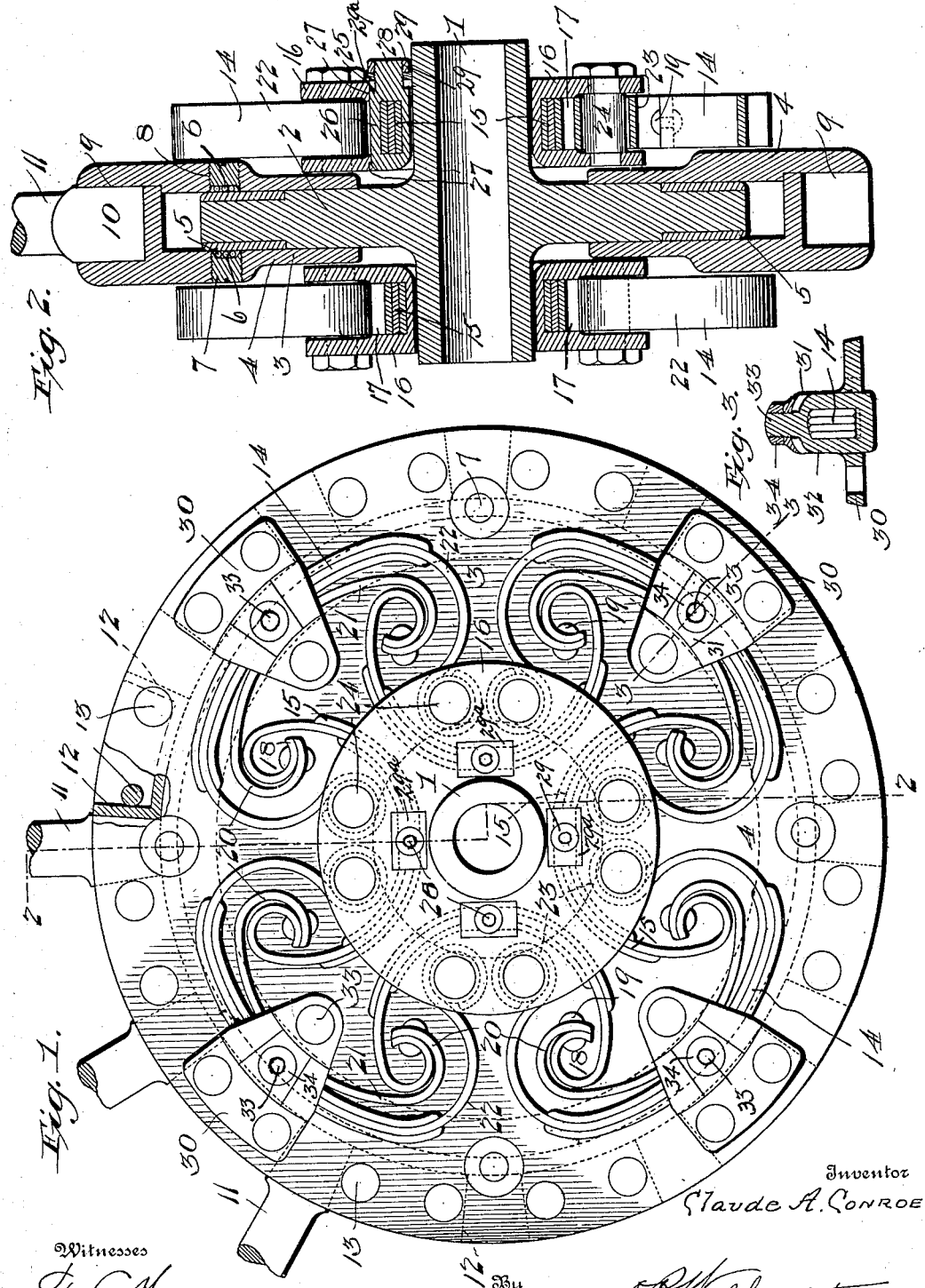
Witnesses
Inventor
Claude A. Conroe.
By
Attorney

UNITED STATES PATENT OFFICE.

CLAUDE A. CONROE, OF TOPEKA, KANSAS.

RESILIENT VEHICLE-WHEEL.

No. 892,135.  Specification of Letters Patent.  Patented June 30, 1908.

Application filed August 10, 1906. Serial No. 330,088.

*To all whom it may concern:*

Be it known that I, CLAUDE A. CONROE, a citizen of the United States, residing at Topeka, in the county of Shawnee and State of Kansas, have invented certain new and useful Improvements in Resilient Vehicle-Wheels, of which the following is a specification.

This invention relates to that type of wheels technically termed spring vehicle wheels and embodying a resilient structure intended to perform the functions of the cushion tired and pneumatic tired wheels while at the same time obviating the disadvantages attendant upon the use of cushion and pneumatic tires.

To this end the invention contemplates a simple, strong, and practical construction of vehicle wheel permitting the use of the ordinary form of tire, while at the same time providing effectual means for maintaining and absorbing shocks incidental to the wheel running over uneven surfaces. In this connection, the invention provides an improved and thoroughly practical spring system embodied in a hub structure, which not only permits a free yielding movement in any direction or any angle for the wheel parts, but at the same time completely absorbs the shocks and vibrations and also provides a positive anchorage between the hub proper and the spokes, whereby the springs act as drivers and effectually resist torsional strains incident to that class of wheels used as drivers for motor vehicles. Hence, one of the special objects of the present invention is to provide a resilient vehicle wheel structure possessing special utility as a wheel for automobiles and similar vehicles.

With these and many other objects in view, which will be readily apparent to those familiar with the art, the invention consists in the novel construction, combination, and arrangement of parts hereinafter more fully described, illustrated, and claimed.

The essential features of the invention involved in the general hub structure, and particularly in the novel spring system, are necessarily susceptible to structural change without departing from the scope of the invention, but a preferred embodiment thereof is shown in the accompanying drawings, in which,—

Figure 1 is a side elevation of the hub portion of a spring vehicle wheel, embodying the present invention. Fig. 2 is a central cross sectional view on the line 2—2 of Fig. 1. Fig. 3 is a cross sectional view on the line 3—3 showing one of the anchoring clamps for the outer series of elliptic cushion springs.

Like references designate corresponding parts in the several figures of the drawings.

In carrying out the present invention, no change is required in the conventional rim and tire portion of an ordinary vehicle wheel, nor in the fastening of the spokes to the rim, as any approved construction of rim and tire and outer spoke fastenings may be utilized for the purposes of the present invention, which reside in the details of construction and novel spring arrangement in making up a resilient hub structure. Hence, for illustrative purposes there is shown in the drawings the hub portion of a vehicle wheel constructed in accordance with the present invention.

Referring to these drawings, the numeral 1 designates the hub sleeve or body preferably consisting of a metal casing suitably keyed to or otherwise mounted upon a vehicle axle, and in adapting this hub sleeve or body for the purposes of the present invention, the same is formed centrally between its ends with an annular supporting and guiding disk flange 2 of sufficient thickness and diameter to provide for effectually supporting the parts of the resilient hub associated therewith. There is associated with the said disk flange 2 a circular spoke supporting boxing 3 substantially comprising a circular cuff slidably embracing the said flange and consisting of the cheek pieces 4, respectively arranged upon opposite sides of the flange 2 and suitably connected together to form the boxing or cuff 3. Inasmuch as there is a loose slidable engagement between the elements 2 and 3, it is desirable to eliminate, as far as possible, the frictional wear between the opposing surfaces thereof, and a practical expedient for accomplishing that result is shown in the accompanying drawings and consists in fitting to the opposite sides of the flange 2, contiguous to the outer edge thereof, the wear rings or plates 5 inserted flush in the said faces of the flange 2, and adapted to provide a rolling contact surface for the antifrictional bearing balls 6 which may be conveniently held at proper intervals at the inner sides of the cheek pieces 4 by means of the ball cups 7. These ball cups 7 are preferably in the form of screw plugs inserted in the threaded openings 8 in the cheek pieces 4, and providing means for adjusting the balls to take up wear. While this is a preferable construction, other expedients may be resorted to for providing an antifriction bearing fit between the shiftable or slidable boxing 3 and the disk flange 2 of the hub sleeve.

In addition to the elements referred to, the shiftable or slidable boxing or cuff 3 is provided in the outer edge thereof with an annular spoke receiving socket 9 preferably in the form of a continuous groove and designed to receive therein the inner tenon ends 10 of the radial wheel spokes 11. To provide for securely fastening the inner ends of the spokes in the groove socket 9, there are preferably employed the fastening filler blocks 12, usually consisting of hollow castings constructed in wedge form and adapted to be tightly wedged between contiguous spoke ends and securely held in place by the securing bolts 13, or equivalent fastening means.

A distinctive feature of the present invention resides in the scheme or system of arranging and anchoring upon opposite sides of the spoke supporting element or cuff 3 opposite sets of springs, each set consisting of an outer and inner series of elliptic springs, the outer springs being designated in their entirety by the reference number 14 and the inner springs being similarly designated by the reference number 15. In connection with the spring mounting, it will first be observed that there is welded or otherwise rigidly fitted upon opposite end portions of the hub sleeve or body 1, and respectively upon opposite sides of the flange 2 and the cuff 3, the oppositely located spring holding rings 16. Each of these rings 16 is preferably of a double flanged construction or of a U-shape in cross section, thereby forming between the sides or cheeks thereof an annular receiving pocket or seat 17 within which are arranged the intermediate or base portions of the inner springs 15. Any number of the inner springs 15 may be utilized in each set at opposite sides of the central flange 2, but the same are arranged uniformly at regular spaced intervals apart and are duplicates in construction, each preferably consisting of a laminated elliptical spring body portion provided with the inturned scroll spring terminals 18, which are riveted or otherwise suitably connected, as at 19, with the complemental inturned scroll spring terminals 20 of the inner leaf members 21 of the adjacent pairs of springs 14 in the outer series. Hence, it will be observed that the springs 14 and 15 of the outer and inner series are arranged in staggered or alternating relation, and referring to the construction of the individual springs 14, it will be noted that each of the same consists of a laminated elliptic spring body having inner and outer leaf members 21 and 22 respectively. The outer leaf member 22 of each spring 14 is of greater diameter than the terminals 18 of the inner member 21 and is provided with terminal holding coils 23 which receive and are held by anchor bolts or pins 24 fitted in the holding ring 16 receiving and supporting the inner series of springs 15, as may be plainly shown in Fig. 1 of the drawings.

To provide for anchoring the intermediate or base portion of each inner spring 15 to the ring 16 holding the same, there is preferably employed for each of said springs an inner anchoring clamp 25 preferably consisting of an eye bolt 26 receiving said base portion of the spring and fitted in bolt openings 27 in the rings 16 and provided at its outer end with a threaded stem 28 receiving the clamping nut 29 which binds against a fixed washer 29$^a$. Similar means are associated with each of the outer springs 14 for anchoring the same to the spoke-cuff or boxing 3. These individual anchoring means for each spring 14 consist of a clamp bracket 30 bolted or otherwise suitably secured to the side of the cuff or boxing 3 and provided with a bolt casing 31 receiving an eye bolt 32 having an outer threaded stem 33 on which is fitted the clamping nut 34, binding against the outer side of the casing 31 of the bracket 30. The eye bolt 32 receives through the eye thereof, the laminated or base member of the outer spring 14 associated therewith. The anchorage for all of the outer springs for each opposite set is the same, and likewise the anchorage for all of the inner springs is the same.

From the foregoing it is to be observed that by reason of the alternating or staggered arrangement and anchorage of the springs, the same will act as drivers for the wheel when the latter is used in connection with motor vehicles, while at the same time the improved construction described provides an effective cushion which obviates shocks and strains incident to the wheel running over uneven surfaces. Normally the springs suspend the hub or hub sleeve centered in the circular boxing or cuff.

From the foregoing it is thought that the construction, action and many advantages of the herein described vehicle wheel will be apparent without further description.

I claim:

1. A vehicle wheel of the character described comprising a hub provided with a central disk flange, a circular spoke supporting cuff slidably embracing said disk flange, inner springs mounted on said hub, and outer springs secured to said cuff, said inner and outer springs being provided with complemental scroll terminals united to each other.

2. A vehicle wheel of the character described comprising a hub provided with a central disk flange, a circular spoke supporting cuff slidably embracing said disk flange, a series of inner springs secured to said hub on each side of said disk flange, a series of outer springs secured to said cuff on opposite sides thereof, the inner and outer springs being provided with scroll terminals united to each other.

3. A vehicle wheel of the character described comprising a hub provided with a central disk flange, a circular spoke supporting cuff slidably embracing said disk flange, inner springs mounted upon said hub, and outer springs mounted upon said cuff, said inner and outer springs being provided with complemental terminals secured to each other, said outer springs being also provided with terminals connected with said hub.

4. A vehicle wheel of the character described comprising a hub provided with a central flange, a circular spoke supporting cuff slidably mounted on said flange, rings mounted on said hub on opposite sides of said flange, inner springs carried by said rings, and outer springs carried by said cuff and having terminals secured to the terminals of said inner springs.

5. A vehicle wheel of the character described comprising a hub provided with a central flange, a circular spoke supporting cuff slidably mounted on said flange, rings mounted on said hub on opposite sides of said flange, inner springs carried by said rings, and outer springs carried by said cuff, said inner and outer springs being provided with complemental scroll terminals united to each other.

6. A vehicle wheel of the character described comprising a hub provided with a central flange, a circular spoke supporting cuff slidably mounted on said flange, rings mounted on said hub on opposite sides of said flange, inner springs carried by said rings, and outer springs carried by said cuff, and having terminals secured to the terminals of said inner springs, said outer springs being also provided with terminals secured to said rings.

7. A vehicle wheel of the character described comprising a hub provided with a central flange, a circular spoke supporting cuff slidably mounted on said flange, rings mounted on said hub on opposite sides of said flange, outer springs carried by said cuff inner springs carried by said rings, said inner and outer springs being provided with complemental scroll terminals united to each other, said outer springs being also provided with terminals secured to said rings.

8. A vehicle wheel of the character described comprising a hub provided with a central flange, a circular spoke supporting cuff slidably mounted on said flange, U shaped rings mounted on said hub on opposite sides of said flange, inner springs secured within said rings, and outer springs carried by said cuff and having terminals secured to the terminals of said inner springs.

9. A resilient vehicle wheel, a hub body having a supporting and guiding flange, a spoke-supporting boxing loosely mounted on said flange and carrying the spokes, spring holding rings mounted on the hub body at opposite sides of said boxing, an outer series of elliptic springs arranged upon opposite sides of the boxing, each of said outer springs having an inner leaf member provided with scroll spring terminals and outer leaf members provided with terminal holding collars anchored to the adjacent spring holding rings, an inner series of elliptic springs carried by the spring holding ring at each side of the flange, said inner springs being arranged in alternating and staggered relation to the outer springs at the same side and each having scroll spring terminals connected to the complemental terminals of the outer springs, an anchoring clamp fastening the base of each inner spring to the holding ring therefor, and an anchoring clamp fastening the base of each outer spring to the spoke-supporting boxing.

In testimony whereof I hereunto affix my signature in the presence of two witnesses.

CLAUDE A. CONROE.

Witnesses:
   JAMES A. TROUTMAN,
   I. M. PLATT.